(12) United States Patent
Olson et al.

(10) Patent No.: US 11,482,215 B2
(45) Date of Patent: Oct. 25, 2022

(54) MULTI-MODAL INTERACTION WITH INTELLIGENT ASSISTANTS IN VOICE COMMAND DEVICES

(71) Applicant: SAMSUNG ELECTRONICS CO., LTD., Suwon-si (KR)

(72) Inventors: Jeffrey C. Olson, Woodside, CA (US); Henry N. Holtzman, San Francisco, CA (US); Jean-David Hsu, San Francisco, CA (US); Jeffrey A. Morgan, Napa, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 429 days.

(21) Appl. No.: 16/367,063

(22) Filed: Mar. 27, 2019

(65) Prior Publication Data

US 2020/0312318 A1 Oct. 1, 2020

(51) Int. Cl.
*G10L 15/22* (2006.01)
*G10L 15/08* (2006.01)

(52) U.S. Cl.
CPC ............. *G10L 15/22* (2013.01); *G10L 15/08* (2013.01); *G10L 2015/088* (2013.01); *G10L 2015/223* (2013.01); *G10L 2015/228* (2013.01)

(58) Field of Classification Search
CPC .................. G06F 3/167; G06F 3/04842; G10L 2015/223; G10L 2015/088; G10L 15/22; G10L 15/26; G10L 15/30; G10L 2015/228; G10L 2021/02166; G10L 15/32; G10L 25/78; G10L 15/08; G10L 15/063; G10L 15/1822; G10L 15/28; G10L 15/187; G10L 17/00; G10L 21/0208; G10L 15/18; G10L 15/20; G10L 21/0232; G10L 2015/226; G10L 25/21; G10L 15/01; G10L 15/1815; G10L 15/183; G10L 15/197; G10L 15/34; G10L 17/22; G10L 2015/0631; G10L 2015/225; G10L 2015/227;
(Continued)

(56) References Cited

U.S. PATENT DOCUMENTS 8,700,392 B1* 4/2014 Hart ..................... G10L 15/25
 704/231
9,484,030 B1* 11/2016 Meaney ................ H04R 3/005
(Continued)

FOREIGN PATENT DOCUMENTS

KR 10-1984090 A 5/2014
KR 2018-0084392 A 7/2018
(Continued)

OTHER PUBLICATIONS

International Search Report and Written Opinion dated Apr. 23, 2020 for International Application PCT/KR2020/000447 from Korean Intellectual Property Office, pp. 1-9, Republic of Korea.
(Continued)

*Primary Examiner* — Matthew H Baker
(74) *Attorney, Agent, or Firm* — Sughrue Mion, PLLC

(57) ABSTRACT

A method comprising detecting an activation of an intelligent assistant on an electronic device, waking up the intelligent assistant from a sleep mode in response to the activation, and determining an amount of vocabulary the intelligent assistant acts upon during a listening mode based on a type of the activation.

18 Claims, 13 Drawing Sheets

(58) Field of Classification Search
CPC ..... G10L 2021/02082; G10L 2025/783; G10L 21/06; G10L 25/51; G10L 25/63; G10L 25/87; G10L 13/00; G10L 15/06; G10L 15/07; G10L 17/04; G10L 17/08; G10L 2015/025; G10L 2015/0638; G10L 2021/02085; G10L 2021/02165; G10L 21/02; G10L 21/028; G10L 25/30; G10L 25/48; G10L 15/02; G10L 15/04; G10L 15/16; G10L 15/25; G10L 15/285

See application file for complete search history.

(56) References Cited

U.S. PATENT DOCUMENTS

| | | | |
|---|---|---|---|
| 9,530,410 B1* | 12/2016 | LeBeau | G10L 15/22 |
| 9,966,070 B2 | 5/2018 | Koetz | |
| 10,192,553 B1* | 1/2019 | Chenier | H04L 65/80 |
| 2007/0049363 A1 | 3/2007 | Green et al. | |
| 2014/0136215 A1 | 5/2014 | Dai et al. | |
| 2015/0025890 A1 | 1/2015 | Jagatheesan et al. | |
| 2015/0206535 A1 | 7/2015 | Iwai | |
| 2015/0340040 A1 | 11/2015 | Mun et al. | |
| 2015/0340042 A1 | 11/2015 | Sejnoha et al. | |
| 2016/0093304 A1* | 3/2016 | Kim | G10L 17/26 704/235 |
| 2016/0119338 A1* | 4/2016 | Cheyer | G06F 21/32 726/4 |
| 2017/0083285 A1 | 3/2017 | Meyers et al. | |
| 2018/0075218 A1 | 3/2018 | Benefield et al. | |
| 2018/0090147 A1 | 3/2018 | Corfield | |
| 2018/0114529 A1* | 4/2018 | Gerner | G10L 15/22 |
| 2018/0151180 A1 | 5/2018 | Yehuday | |
| 2018/0204569 A1 | 7/2018 | Nadkar et al. | |
| 2018/0266751 A1 | 9/2018 | Lim et al. | |
| 2019/0027138 A1 | 1/2019 | Wang et al. | |
| 2019/0278339 A1* | 9/2019 | Cooper | G06F 1/1616 |
| 2019/0371342 A1* | 12/2019 | Tukka | H04W 52/0254 |
| 2020/0362497 A1 | 11/2020 | Park et al. | |

FOREIGN PATENT DOCUMENTS

| | | |
|---|---|---|
| KR | 10-2018-0130316 A | 12/2018 |
| WO | 2018213415 A1 | 11/2018 |

OTHER PUBLICATIONS

Communication dated Feb. 9, 2022, issued by the European Patent Office in counterpart European Application No. 20777065.2.

* cited by examiner

MULTI-MODAL INTERACTION WITH INTELLIGENT ASSISTANTS IN VOICE COMMAND DEVICES

TECHNICAL FIELD

One or more embodiments generally relate to voice command devices, in particular, a method and system for emergent multi-modal interaction with intelligent assistants in voice command devices.

BACKGROUND

A voice user interface provides a way of interacting with an intelligent personal assistant (IPA) or a virtual assistant (VA) operating on a voice command device. Colloquially, an IPA or a VA is called an "intelligent assistant". A voice command device is a device controllable with a voice user interface (i.e., a voice controlled device). A voice user interface makes spoken human interaction with devices possible, using speech recognition to understand voice commands (i.e., spoken commands) and questions, and text-to-speech to output replies. With advances in automatic speech recognition (ASR) and natural language understanding (NLU), voice user interfaces are becoming increasingly popular in devices such as, but not limited to, automobiles, mobile devices (e.g., smartphones, tablets, watches, etc.), appliances (e.g., washers, dryers, etc.), entertainment devices (e.g., televisions, smart speakers, etc.), etc.

SUMMARY

One embodiment provides a method comprising detecting an activation of an intelligent assistant on an electronic device, waking up the intelligent assistant from a sleep mode in response to the activation, and determining an amount of vocabulary the intelligent assistant acts upon during a listening mode based on a type of the activation.

Another embodiment provides an electronic device comprising at least one sensor unit, at least one input/output (I/O) unit, at least one processor, and a non-transitory processor-readable memory device storing instructions that when executed by the at least one processor causes the at least one processor to perform operations. The operations include detecting a physical interaction with the electronic device via the at least one sensor unit, and activating an intelligent assistant on the electronic device from a sleep mode in response to the physical interaction.

One embodiment provides a non-transitory processor-readable medium that includes a program that when executed by a processor performing a method comprising detecting an activation of an intelligent assistant on an electronic device, waking up the intelligent assistant from a sleep mode in response to the activation, and determining an amount of vocabulary the intelligent assistant acts upon during a listening mode based on a type of the activation.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which.

DETAILED DESCRIPTION

Figure 1:
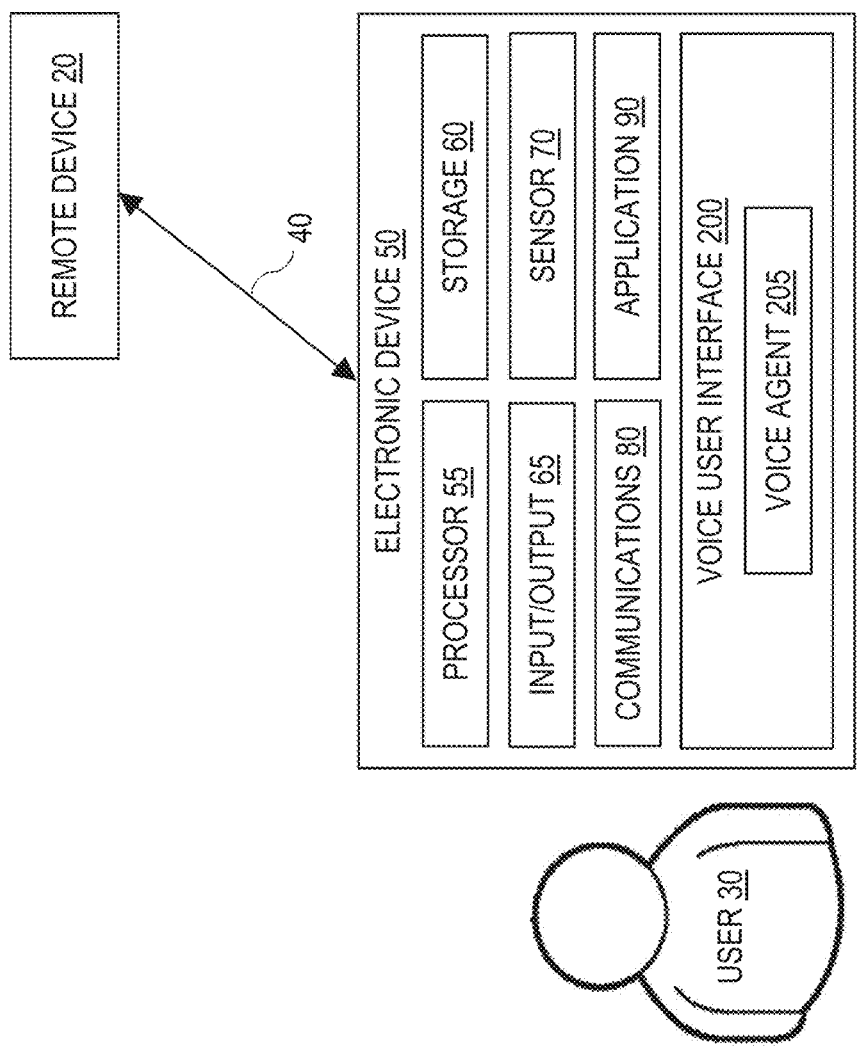
FIG. 1 illustrates an example computing architecture for implementing emergent multi-modal interaction with an intelligent assistant embodied in an electronic device 50, in one or more embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments generally relate to voice command devices, in particular, a method and system for emergent multi-modal interaction with intelligent assistants in voice command devices. One embodiment provides a method comprising detecting an activation of an intelligent assistant on an electronic device, waking up the intelligent assistant from a sleep mode in response to the activation, and determining an amount of vocabulary the intelligent assistant acts upon during a listening mode based on a type of the activation.

Another embodiment provides an electronic device comprising at least one sensor unit, at least one input/output (I/O) unit, at least one processor, and a non-transitory processor-readable memory device storing instructions that when executed by the at least one processor causes the at least one processor to perform operations. The operations include detecting a physical interaction with the electronic device via the at least one sensor unit, and activating an intelligent assistant on the electronic device from a sleep mode in response to the physical interaction.

One embodiment provides a non-transitory processor-readable medium that includes a program that when executed by a processor performing a method comprising detecting an activation of an intelligent assistant on an electronic device, waking up the intelligent assistant from a sleep mode in response to the activation, and determining an amount of vocabulary the intelligent assistant acts upon during a listening mode based on a type of the activation.

As speech is generally present in an environment where one or more voice command devices are present and only a small portion of the speech is meant for a particular voice command device, one of the challenges a voice command device encounters is determining which speech is intended for the device.

Conventionally, a user may indicate that an utterance (i.e., a voice command) from the user is intended for a particular voice command device by interacting with a speech input button. For example, the speech input button may be a dedicated physical button or another type of I/O component coupled to or integrated with the device. As another example, the speech input button may be a software component of a graphical user interface (GUI) displayed on a display coupled to or integrated with the device.

Another conventional solution is a user producing a special utterance (e.g., a word or a phrase) that instructs a particular voice command device to attend to a voice command following the special utterance. Colloquially, the special utterance is called a "wake word." For example, with a GALAXY® Note9™ smart phone from Samsung®, a user can press a dedicated physical button on a side of the phone and issue a voice command. Alternatively, the user can say a special utterance first, such as "Hi Bixby®", and follow up the special utterance with a voice command.

One or more embodiments provide a voice user interface system for activating a voice agent (i.e., intelligent assistant) operating on an electronic device based on one or more physical interactions with the device that a user usually performs when utilizing the device. In one embodiment, the voice user interface system is configured to listen, when appropriate, for voice interactions that make sense in tandem with how the device is being physically manipulated. Unlike conventional solutions that require explicit activation from a user (e.g., via interacting with a speech input button or saying a special utterance), this voice user interface system provides automatic wake up of the voice agent where the wake up is implicit (i.e., does not require explicit activation from a user).

FIG. 1 illustrates an example computing architecture 10 for implementing emergent multi-modal interaction with an intelligent assistant embodied in an electronic device 50, in one or more embodiments. The computing architecture 10 comprises an electronic device 50 including resources, such as one or more processor units 55 and one or more storage units 60. One or more applications may execute/operate on the electronic device 50 utilizing the resources of the electronic device 50.

Examples of an electronic device 50 include, but are not limited to, a desktop computer, a mobile electronic device (e.g., a tablet, a smart phone, a laptop, etc.), a wearable device (e.g., a smart watch, etc.), an Internet of Things (IoT) device, a smart appliance such as a smart television, a smart oven, a smart washer, a smart light, etc.

In one embodiment, the electronic device 50 comprises one or more sensor units 70 integrated in or coupled to the electronic device 50, such as a camera, a microphone, a GPS, a motion sensor, etc. A sensor unit 70 may be utilized to capture content and/or sensor-based contextual information. For example, an application on the electronic device 50 may utilize at least one sensor unit 70 to capture content and/or sensor-based contextual information, such as a microphone for audio data (e.g., voice commands, ambient noise, etc.), a camera for image data (e.g., still and/or video images of an environment surrounding the electronic device 50, etc.), a GPS for location data (e.g., location coordinates), a motion sensor for proximity/motion data (e.g., data indicative of a user 30 within proximity of the electronic device 50), etc.

In one embodiment, the electronic device 50 comprises one or more I/O units 65 integrated in or coupled to the electronic device 50. In one embodiment, the one or more I/O units 65 include, but are not limited to, a physical user interface (PUI) and/or a GUI, such as a keyboard, a keypad, a touch interface, a touch screen, a knob, a button, a display screen, etc. In one embodiment, a user 30 can utilize at least one I/O unit 65 to configure one or more user preferences, configure one or more parameters (e.g., user permissions), provide input (e.g., a search query), etc.

In one embodiment, the electronic device 50 is a voice command device. The one or more applications on the electronic device 50 include, but are not limited to, a voice user interface system 200 configured to facilitate hands-free user interaction with the electronic device 50. In one embodiment, the system 200 provides a voice agent 205, wherein the voice agent 205 is an intelligent assistant configured to allow a user 30 to control the electronic device 50 via voice.

In one embodiment, the voice agent 205 has at least two different operating modes: a sleep mode in which the voice agent 205 is asleep (i.e., not active or in a powered down state), and a listening mode in which the voice agent 205 is awake (i.e., active or in a powered up state) and listening for a voice command from a user 30 (e.g., a voice command captured via at least one sensor unit 70).

As described in detail later herein, in one embodiment, the system 200 comprises a listening agent 250 (FIG. 3) configured to: (1) detect one or more activation conditions for waking up (i.e., activating) the voice agent 205 from the sleep mode, and (2) trigger the voice agent 205 to transition from the sleep mode to the listening mode in response to the one or more activation conditions detected.

In one embodiment, the voice agent 205 can be activated via different types of activation methods. For example, in one embodiment, the voice agent 205 is activated explicitly via a wake word activation. A wake word activation is an example activation condition requiring an explicit utterance from a user 30 ("user utterance") of a particular wake word for the electronic device 50. In one embodiment, the voice agent 205 is configured to wake up from the sleep mode in response the system 200 detecting (e.g., via the listening agent 250 and at least one sensor unit 70) a user utterance of the wake word. For example, the voice agent 205 is woken up from the sleep mode in response to a microphone capturing a user utterance of the wake word.

As another example, in one embodiment, the voice agent 205 is activated automatically via a physical event activation without requiring a user utterance. A physical event activation is an example activation condition requiring a physical interaction that is typical of a user 30 utilizing the electronic device 50. In one embodiment, the voice agent 205 is configured to automatically wake up from the sleep mode in response the system 200 detecting (e.g., via the listening agent 250 and at least one sensor unit 70 and/or at least one I/O unit 65) a physical interaction with the electronic device 50. Examples of different physical interactions that can automatically wake up the voice agent 205 from the sleep mode include, but are not limited to, a mechanical interaction (i.e., mechanical actuation) with a movable/rotatable/adjustable member of the electronic device 50 such as a door closure activation (e.g., a user 30 shutting a door of the electronic device 50), a proximity interaction (e.g., a user 30 is within physical proximity of the electronic device 50, a user 30 has entered a room including the electronic device 50), a user interface (UI) activation such as an actuation of a PUI (e.g., a user 30 interacting with a knob, a button, and/or another hardware I/O unit 65) or a GUI (e.g., a user 30 interacting with a touch screen and/or another software I/O unit 65).

For example, if the electronic device 50 comprises a smart washer, the voice agent 205 is automatically woken up from the sleep mode in response to at least one sensor unit 70 detecting a door of a washing chamber of the washer closing, thereby saving a user 30 from having to explicitly utter a wake word for the electronic device 50 to wake up the voice agent 205.

In one embodiment, the system 200 is configured to utilize different interaction feedback methods for providing feedback to a user 30 (e.g., visual and/or speech feedback indicating a current mode of the voice agent 205 and/or a response, etc.) based on a type of activation method used to activate the voice agent 205.

In one embodiment, the system 200 is configured to control the number and the type of actions that the electronic device 50 can be invoked/triggered to perform via voice commands based on contextual information such as, but not limited to, a context of a user 30, a context of the electronic device 50 such as current state (i.e., current configuration), an environment of the user 30 and/or the electronic device 50 such as time, day, temperature, weather, ambient lighting, location, etc.

In one embodiment, the system 200 is configured to determine an identity of a user 30 who produced a user utterance detected via the listening agent 250 based on voice identification (ID), and control actions the user 30 can request the electronic device 50 to perform via voice based on the identity of the user 30. In one embodiment, voice ID involves determining voice patterns/qualities of the user 30 (e.g., sound, rhythm, dialect, pitch, etc.) based on the user utterance, and comparing the voice patterns/qualities against voice patterns/qualities of recognized/identified voice recordings (e.g., maintained on the one or more storage units 60). For example, if the electronic device 50 comprises a smart washer, the system 200 can permit only particular, authorized users 30, such as adults in a household, to start the washer via voice without having to actuate a physical UI or a GUI after the system 200 detects a door closure of the washer. Restricting the start of the washer to only a voice command from an adult after detecting a door closure of the washer ensures safe operation of the washer. For example, such restrictions can prevent an unauthorized user 30, such as a child, from being able to start the washer (e.g., the child may get inside the washer and attempt to turn on the washer via voice after closing the door of the washer).

In one embodiment, the system 200 is configured to recognize, based on a type of activation method used to activate the voice agent 205 and voice ID, that one or more user utterances detected by the listening agent 250 are not intended for the electronic device 50, thereby reducing a likelihood of user speech activating an unintentional or undesired action on the electronic device 50.

In one embodiment, the system 200 is configured to adjust an amount of vocabulary required for the system 200 to interpret a user utterance to only what is contextually relevant based on a type of activation method used to activate the voice agent 205 and/or a current state of the electronic device 50, thereby ensuring that only voice commands that are appropriate for the current state of the electronic device 50 are acted upon.

In one embodiment, the one or more applications on the electronic device 50 may further include one or more software mobile applications 90 loaded onto or downloaded to the electronic device 50, such as a camera application, a social media application, etc. A software mobile application 90 on the electronic device 50 may exchange data with the system 200.

In one embodiment, the electronic device 50 comprises a communications unit 80 configured to exchange data with one or more remote devices 20 and/or one or more other electronic devices 50 over a communications network/connection 40 (e.g., a wireless connection such as a Wi-Fi connection or a cellular data connection, a wired connection, or a combination of the two). The communications unit 80 may comprise any suitable communications circuitry operative to connect to a communications network (e.g., communications network 40) and to exchange communications operations and media from the electronic device 50 to other devices connected to the communications network 40. The communications unit 80 may be operative to interface with the communications network 40 using any suitable communications protocol such as, for example, Wi-Fi (e.g., an IEEE 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

For example, a remote device 20 may comprise a remote server (e.g., a computer, device, or program that manages network resources, etc.) providing an online platform for hosting one or more online services (e.g., an online social media service, an online data source, etc.) and/or distributing one or more software mobile applications 90. As another example, the system 200 may be loaded onto or downloaded to the electronic device 50 from a remote device 20 that maintains and distributes updates for the system 200. As yet another example, a remote device 20 may comprise a cloud computing environment providing shared pools of configurable computing system resources and higher-level services.

Figure 2:
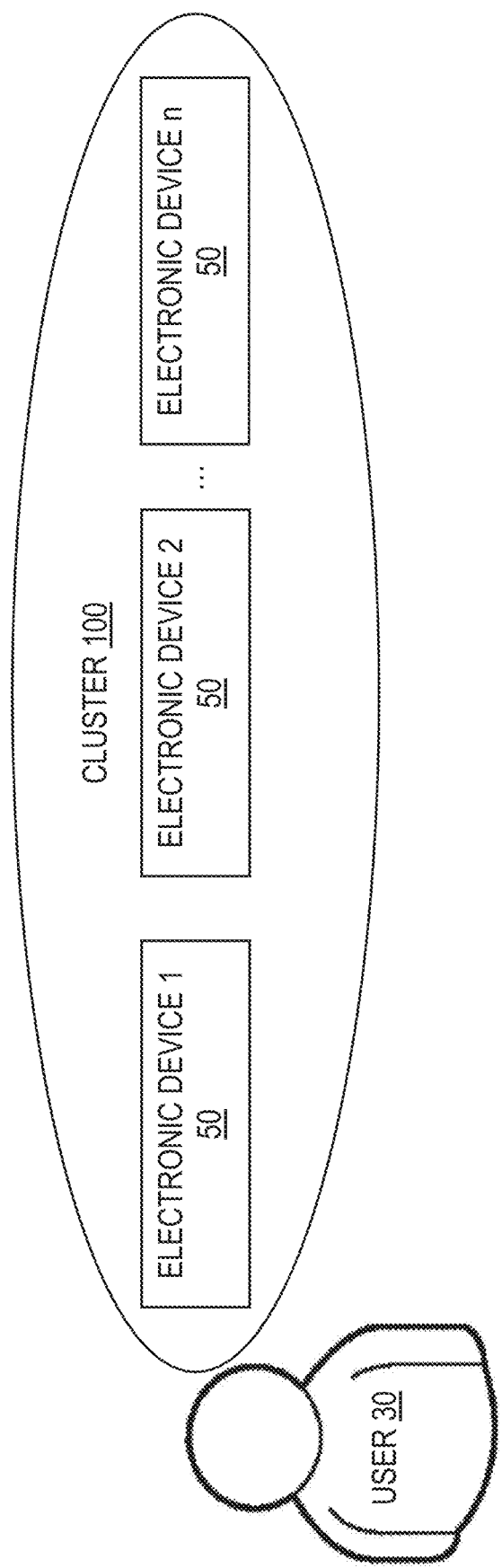
FIG. 2 illustrates an example cluster of electronic devices, in one or more embodiments.

FIG. 2 illustrates an example cluster 100 of electronic devices 50, in one or more embodiments. The cluster 100 comprises a combination of different electronic devices 50, such as ELECTRONIC DEVICE 1, ELECTRONIC DEVICE 2, . . . , and ELECTRONIC DEVICE n, that a user 30 can control via voice, wherein n is a positive integer.

In one embodiment, the cluster 100 of different electronic device 50 can be located within proximity of one another (e.g., within one or more rooms in a household). For example, the cluster 100 comprises at least one of the following electronic devices 50 located in a kitchen: a smart microwave, a smart range, a smart oven, a smart dishwasher, a family hub, etc. As another example, the cluster 100 comprises at least one of the following electronic devices 50 located in a laundry room: a smart washer, a smart dryer, etc.

In one embodiment, each electronic device 50 of the cluster 100 is configured to exchange data with one or more other electronic devices 50 of the cluster 100 over a communications network/connection (e.g., a wireless connection such as a WiFi connection or a cellular data connection, a wired connection, or a combination of the two).

In one embodiment, a user 30 can simultaneously activate all voice agents 205 of all electron devices 50 of the cluster 100 via wake word activation.

In one embodiment, a user 30 can automatically activate only one voice agent 205 of one electronic device 50 of the cluster 100 via a physical event activation that involves the electronic device 50. As popular voice user interfaces typically share the same wake word across multiple electronic devices 50 (e.g., the wake word "Alexa®" is used to activate different Amazon® voice command devices, the wake word "Siri®" to used to activate different Apple® voice command devices, the wake phrase "Hey Google®" is used to activate different Android® voice command devices, etc.), physical event activation removes the problem of knowing which particular electronic device 50 is being activated by a wake word, thereby reducing a likelihood of multiple electronic devices 50 being simultaneously activated. Physical event activation relieves a user 30 from having to say a wake word, and also saves the user 30 from having to specify which particular electronic device 50 should attend to a voice command.

In one embodiment, an electronic device 50 of the cluster 100 can operate as a master device that controls one or more other electronic devices 50 of the cluster 100 (e.g., trigger/invoke the one or more other electronic devices 50 to perform one or more actions in response to one or more voice commands).

In one embodiment, an action performed at one electronic device 50 of the cluster 100 can trigger a voice agent 205 of another electronic device 50 of the cluster 100 to wake up from the sleep mode. For example, an action performed at a first electronic device 50 of the cluster 100 can trigger a voice agent 205 of a second electronic device 50 of the cluster 100 that operates as a master device to wake up from the sleep mode and listen for voice commands that are intended for the first electronic device 50.

In one embodiment, a portable or moveable electronic device 50 can be added to or removed from the cluster 100, such as a smart AI speaker or a smart phone.

Figure 3:
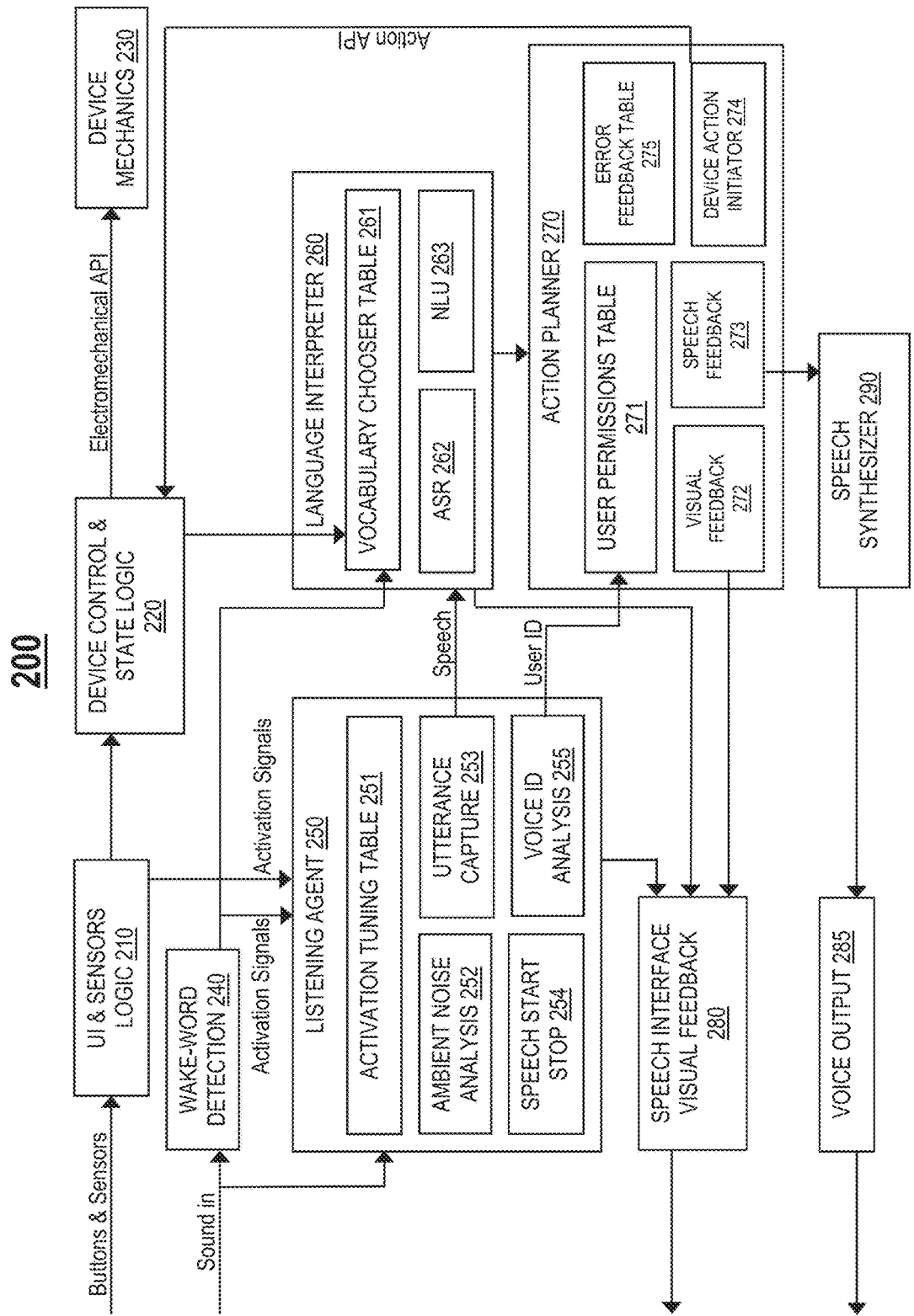
FIG. 3 illustrates an example voice user interface system embodied in an electronic device, in one or more embodiments.

FIG. 3 illustrates an example voice user interface system 200 embodied in an electronic device 50, in one or more embodiments. A voice agent 205 operating in an electronic device 50 is implemented by one or more components of the voice user interface system 200.

In one embodiment, the system 200 comprises a UI & sensors logic unit 210 configured to: (1) receive UI & sensor data captured by at least one I/O unit 65 and/or at least one sensor unit 70, wherein the UI & sensor data is indicative of one or more physical interactions with the electronic device 50, (2) generate one or more activation signals in response to the one or more physical interactions detected, wherein the one or more activation signals trigger the voice agent 205 to automatically wake up from the sleep mode, and (3) generate control data indicative of one or more adjustments/updates to a current state of the electronic device 50.

In one embodiment, the system 200 comprises a wake word detection unit 240 configured to: (1) receive audio data (i.e., sound in data) captured by at least one sensor unit 70 (e.g., a microphone), wherein the audio data comprises ambient noise and/or one or more user utterances, (2) determine whether the audio data comprises an explicit user utterance of a wake word for the electronic device 50, and (3) generate one or more activation signals in response to determining the audio data comprises an explicit user utterance of the wake word, wherein the one or more activation signals trigger the voice agent 205 to wake up from the sleep mode.

In one embodiment, the system 200 comprises a device control and state logic unit 220 configured to provide an electromechanical application programming interface (API) for communicating with one or more mechanical parts ("device mechanics") 230 of the electronic device 50. The device control and state logic unit 220 allows for the one or more device mechanics 230 to be controlled via the electromechanical API based on control data (e.g., from the UI & sensors logic unit 210 and/or from a device action initiator 274).

In one embodiment, the device control and state logic unit 220 is configured to generate state data indicative of at least one of the following: a current state of the electronic device 50, or one or more recent actions performed by the electronic device 50.

In one embodiment, the system 200 comprises a listening agent 250. When the voice agent 205 is in the sleeping mode, the listening agent 250 is configured to: (1) receive one or more activation signals from the UI & sensors logic unit 210 and/or the wake word detection unit 240, and (2) awaken the voice agent 205 from the sleep mode and place the voice agent 205 in the listening mode in response to the one or more activation signals. As stated above, the voice agent 205 can either be woken up explicitly via a wake word activation or automatically via a physical event activation.

When the voice agent 205 is in the listening mode, the listening agent 250 is configured to listen for one or more voice commands from a user 30. Specifically, the listening agent 250 is configured to: (1) receive audio data captured by at least one sensor unit 70 (e.g., a microphone), wherein the audio data comprises ambient noise and/or one or more user utterances, and (2) analyze the audio data.

The listening agent 250 comprises one or more components for analyzing audio data. In one embodiment, the listening agent 250 comprises an ambient noise analysis unit 252 configured to analyze audio data to determine whether the audio data comprises ambient noise. In one embodiment, the listening agent 250 comprises an utterance capture unit 253 configured to: (1) analyze audio data to determine whether the audio data comprises a user utterance, and (2) in response to determining the audio data comprises a user utterance, capture/extract the user utterance in the audio data as speech data (i.e., data including spoken language). As described in detail later herein, the speech data can be forwarded to another component of the system 200 for automatic speech recognition (ASR).

In one embodiment, the listening agent 250 comprises a voice ID analysis unit 255 configured to determine a user ID indicative of an identity of a user 30 who produced a user utterance included in audio data based on voice ID. As described in detail later herein, the user ID can be forwarded to another component of the system 200 for determining one or more user permissions for the user 30.

In one embodiment, the listening agent 250 comprises a speech start stop unit 254 configured to: (1) wait and listen for a user utterance for a pre-determined amount of time (i.e., a timing window), and (2) generate/issue a timeout when the pre-determined amount of time has elapsed and a complete user utterance is unavailable. In one embodiment, the listening agent 250 is configured to generate different types of timeouts, wherein each type of timeout has its own corresponding timing window. For example, in one embodiment, the listening agent 250 generates a no-speak timeout indicating that no user utterance has been detected after a corresponding time window for the no-speak timeout has elapsed (i.e., the listening agent 250 has detected an absence of voice commands during the time window). As another example, in one embodiment, the listening agent 250 generates a command-too-long timeout indicating that a user utterance detected is too long (i.e., the user utterance is not complete) after a corresponding time window for the command-too-long timeout has elapsed.

In one embodiment, the system 200 maintains one or more activation rules that adapt one or more algorithms for controlling one or more behaviors of the electronic device 50 based on a type of activation method used to activate the voice agent 205 (e.g., wake word activation or physical event activation). For example, in one embodiment, one or more parameters controlling one or more behaviors of the listening agent 250 are selectively adjusted/tuned based on a type of activation method used to activate the voice agent 205.

In one embodiment, the listening agent 250 comprises an activation tuning table 251 configured to maintain one or more activation rules for adapting one or more parameters controlling one or more behaviors of the listening agent 250 based on a type of activation method used to activate the voice agent 205. For example, in one embodiment, for a parameter controlling a timing window for a no-speak timeout, the timing window is shorter (e.g., 1.5 seconds) if the voice agent 205 is activated via physical event activation (e.g., door closure), whereas the timing window is longer (e.g., 10 seconds) if the voice agent 205 is activated via wake word activation.

Table 1 below provides an example set of activation rules maintained in an activation tuning table 251, in one or more embodiments.

TABLE 1

| Parameter | Parameter Value for Wake Word Activation | Parameter Value for Physical Event Activation |
| --- | --- | --- |
| No-speak timeout | 10 Seconds | 1.5 Seconds |
| Command-too-long timeout | 15 Seconds | 5 Seconds |

In one embodiment, the system 200 comprises a language interpreter 260 configured to interpret spoken language included in a user utterance. In one embodiment, the language interpreter 260 comprises an ASR unit 262 configured to receive speech data from the utterance capture unit 253, and recognize and translate spoken language included in the speech data into text based on ASR.

In one embodiment, the language interpreter 260 comprises a natural language understanding (NLU) unit 263 configured to receive text from the ASR unit 262, and determine an intent of a voice command from a user 30 based on the text and NLU. For example, in one embodiment, the intent is indicative of an action that the user 30 wants the electronic device 50 to perform either now or sometime in the future. In one embodiment, the language interpreter 260 can generate and forward intent data indicative of an intent of a voice command from a user 30 to another component of the system 200.

In one embodiment, the language interpreter 260 maintains different vocabularies available for use in interpreting spoken language included in a user utterance. In one embodiment, the language interpreter 260 is configured to select a particular vocabulary to utilize from the different vocabularies available based on a type of activation method used to activate the voice agent 205 and/or a current state of the electronic device 50. For example, in one embodiment, the system 200 is configured to detect user speech that is not intended for the electronic device 50 when the voice agent is activated via physical event activation. In one embodiment, if the voice agent is activated via physical event activation, to reduce a likelihood of the electronic device 50 performing an undesired or unintentional action based on user speech, the language interpreter 260 is configured to select a vocabulary to utilize that is reduced/smaller compared to one or more other vocabularies available. In one embodiment, the language interpreter 260 is configured to select a vocabulary to utilize that is suitable for use in interpreting only voice commands that are available based on a current state of the electronic device 50, thereby ensuring that the electronic device 50 will perform an action that a user 30 intends or desires for the electronic device 50 to perform.

As another example, if the electronic device 50 comprises a smart light in a room and the voice agent 205 is activated in response to sensor-based contextual information indicating that a user 30 has just entered the room (e.g., detected via at least one sensor unit 70, such as a motion sensor), the language interpreter 260 is configured to select a vocabulary to utilize during a listening window (e.g., a brief period of time after the user 30 has entered the room) that is reduced/smaller compared to one or more other vocabularies available, wherein the selected vocabulary includes only a restricted/reduced set of voice commands the user 30 is permitted to make. For example, the smart light will only turn on if the user 30 issues the voice command "Lights on". This restriction prevents the smart light from automatically turning on when the user 30 enters the room after bed time and reduces a likelihood of disturbing any sleeping occupants in the room. By comparison, if the voice agent 205 is activated in response to a wake word activation instead, the language interpreter 260 is configured to select a vocabulary to utilize during a listening window that is larger compared to a vocabulary utilized in response to a physical event activation.

In one embodiment, the language interpreter 260 comprises a vocabulary chooser table 261 maintaining different vocabularies available for the language interpreter 260 to select and use based on a type of activation method used to activate the voice agent 205 and/or a current state of the electronic device 50. For example, in one embodiment, if the electronic device 50 comprises a smart washer that is currently stopped and the voice agent 205 is activated via either closing a door of a washing chamber of the washer or actuating a physical UI/GUI, the language interpreter 260 selects from the vocabulary chooser table 261 a vocabulary that includes the word "Start", thereby enabling a user 30 to start the washer by simply uttering the word "Start" (i.e., the user 30 need not explicitly utter a wake word for the electronic device 50).

Table 2 below provides an example set of different vocabularies maintained in a vocabulary chooser table 261, in one or more embodiments.

TABLE 2

| Word | Available on activation via door closure? | Available on activation via actuating a physical UI/GUI? | Current State of Electronic Device |
|---|---|---|---|
| "Start" | Yes | Yes | Stopped |
| "Stop" | No | Yes | Running (e.g., running wash cycles if the electronic device comprises a washer) |
| Words requesting particular network services or information, such as time, weather, Q&A, etc. | No | No | N/A |

In one embodiment, the system 200 comprises an action planner 270 configured to receive at least one of the following: (1) intent data from the language interpreter 260, and (2) a user ID from the voice ID analysis unit 255.

In one embodiment, the action planner 270 comprises a device action initiator 274 configured to plan/schedule one or more actions for the electronic device 50 to perform either now or in the future based on intent data and/or user ID. The device action initiator 274 provides an action API for communicating with the device control and state logic unit 220. The device action initiator 274 allows for making one or more adjustments/updates to a current state of the electronic device 50 via the action API to carry out the one or more actions.

In one embodiment, the system 200 is configured to utilize different interaction feedback methods for providing feedback to a user 30 based on a type of activation method used to activate the voice agent 205. In one embodiment, the system 200 comprises a speech interface visual feedback component 280 comprising one or more I/O units 65 (e.g., one or more indicator lights, a display screen, etc.) for displaying visual feedback indicative of a current mode of the voice agent 205, such as whether the voice agent 205 is listening (i.e., waiting and listening for a user utterance), whether the voice agent 205 is thinking (i.e., interpreting a user utterance), whether the voice agent 205 is responding (i.e., providing feedback), whether the voice agent 205 is in the sleep mode, etc. For example, an indicator light can selectively flash different colors and/or adjust intensity/brightness based on a current mode of the voice agent 205 (e.g., flash green if the voice agent 205 is listening, flash yellow if the voice agent 205 is thinking, flash red if the voice agent 205 is responding, dim if the voice agent 205 is in the sleep mode), a display screen can selectively display different phrases based on the current mode of the voice agent 205 (e.g., display "Listening . . . " if the voice agent 205 is listening, display "Thinking . . . " if the voice agent 205 is thinking, display "Responding . . . " if the voice agent 205 is responding).

In one embodiment, the system 200 comprises a speech synthesizer unit 290 configured to generate a speech response (e.g., via text-to-speech) indicative of a current mode of the voice agent 205, an error (e.g., a timeout), and/or an acknowledgement/confirmation. In one embodiment, the system 200 comprises a voice output component 285 comprising one or more I/O units 65 (e.g., a speaker, etc.) for outputting a speech response received from the speech synthesizer unit 290. For example, the system 200 can selectively generate and output different speech responses based on the current mode of the voice agent 205 (e.g., output "Listening . . . " if the voice agent is listening, output "Thinking . . . " if the voice agent is thinking, output "Responding . . . " if the voice agent is responding).

In one embodiment, the action planner 270 comprises a visual feedback unit 272 configured to trigger the speech interface visual feedback component 280 to display a particular visual feedback based on intent data and/or user ID. In one embodiment, the action planner 270 comprises a speech feedback unit 273 configured to trigger the speech synthesizer component 290 to generate a particular speech response based on intent data and/or user ID.

In one embodiment, the system 200 is configured to selectively generate and output a speech response based on a type of activation method used to activate the voice agent 205. For example, in one embodiment, if the voice agent 205 is activated via wake word activation and the system 200 encounters an error (e.g., a voice command includes a word not included in a vocabulary utilized by the language interpreter 260, a timeout, a user 30 does not have user permissions to control the electronic device 50 via voice, etc.), the system 200 is configured to generate and output a speech response indicating that a voice command received is unknown. As another example, in one embodiment, if the voice agent 205 is activated via physical event activation and the system 200 encounters an error, the system 200 is configured not to generate and output a speech response indicative of that no voice command was received.

In one embodiment, the action planner 270 comprises an error feedback table 275 maintaining one or more error feedback rules for use in controlling when a speech response is generated and outputted by the system 200 based on a type of activation method used to activate the voice agent 205.

Table 3 below provides an example set of error feedback rules maintained in an error feedback table 275, in one or more embodiments.

TABLE 3

| Type of Activation Method | Error Type | Generate Speech Response? |
|---|---|---|
| Wake Word Activation | No voice command received | Yes |
| Physical Event Activation | No voice command received | No |
| Wake Word Activation | Missing required parameter | Yes |
| Physical Event Activation | Missing required parameter | Yes |

In one embodiment, the action planner 270 comprises one or more user permissions table 271 corresponding to one or more users 30, wherein each user permission table 271 maintains one or more user permissions for a corresponding user 30. The action planner 270 utilizes a user permissions table 271 corresponding to a user 30 to determine whether the user 30 is authorized to control the electronic device 30 via voice based on a user ID for the user 30 and/or a type of activation method used to activate the voice agent 205.

Table 4 below provides an example set of user permissions maintained in a user permissions table 271 corresponding to a user 30, in one or more embodiments.

TABLE 4

| Type of Activation Method | Voice Command | User Permissions Based on User ID Required? |
|---|---|---|
| Wake Word Activation | Start | Yes |
| UI Activation | Start | No |
| Door Closure Activation | Start | Yes |

Figure 4:
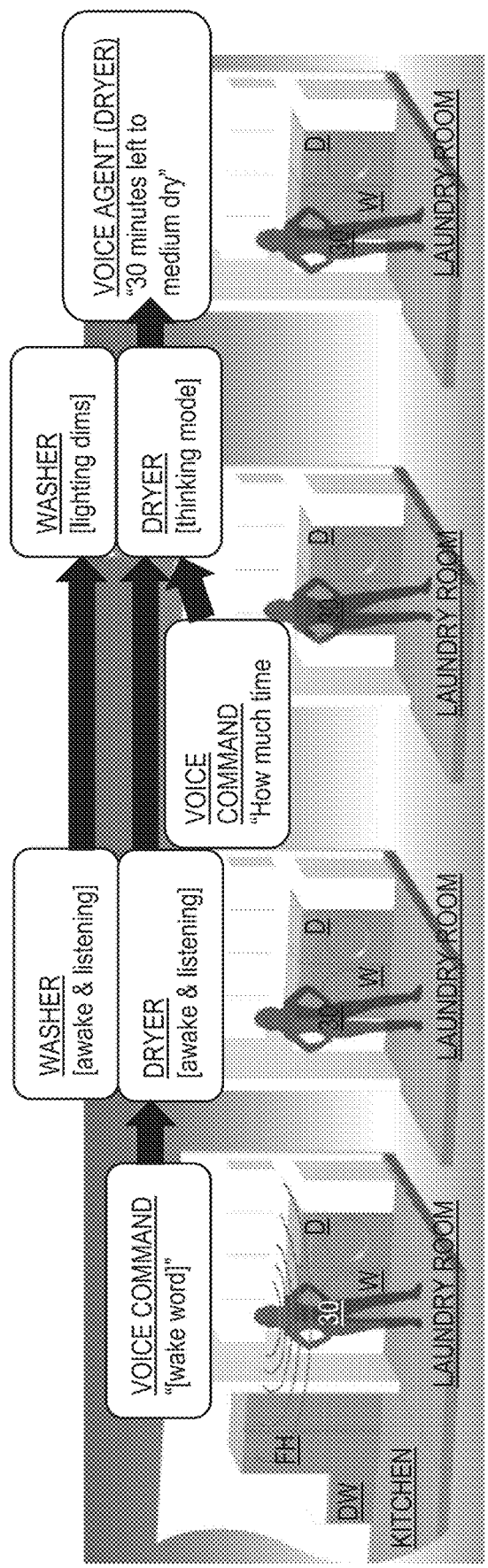
FIG. 4 illustrates a first example scenario involving multi-modal interaction with an intelligent assistant embodied in multiple electronic devices, in one or more embodiments.

FIG. 4 illustrates a first example scenario involving multi-modal interaction with an intelligent assistant embodied in multiple electronic devices 50, in one or more embodiments. In one embodiment, a user 30 can activate a voice agent 205 operating in an electronic device 50 that is either closest to the user 30 or part of a cluster of electronic devices 50 that closest to the user 30. As shown in FIG. 4, a user 30 located in a laundry room can activate a voice agent 205 of a smart washer W and a voice agent 205 of a smart dryer D via wake word activation, wherein the smart washer W and the smart dryer D form a cluster of electronic devices 50 in the laundry room that is closest to the user 30. For example, the user 30 activates the voice agent 205 of the smart washer W and the voice agent of the smart dryer D via an explicit utterance of a wake word.

As shown in FIG. 4, both the voice agent 205 of the smart washer W and the voice agent 205 of the smart dryer D wake up in response to the wake word. In one embodiment, if a voice agent 205 of an electronic device 50 detects that a user 30 is not within proximity (e.g., via at least one sensor unit 70), the voice agent 205 determines that the electronic device 50 is neither closest to the user 30 nor part of a cluster of electronic devices 50 closest to the user 30, and ignores a wake word activation from the user 30. For example, both a voice agent 205 of a smart refrigerator (operating as a family hub) in a kitchen and a voice agent 205 of a smart dishwasher DW in the kitchen are not activated by the wake word as the user 30 is not within proximity of the smart refrigerator FH and the smart dishwasher DW.

As shown in FIG. 4, the user 30 follows the wake word with a voice command that comprises an inquiry of how much time is left on the smart dryer D. The voice agent 205 of the smart washer W determines the inquiry is not intended for the smart washer W, rejects the inquiry, and displays visual feedback to the user 30 that indicates the voice agent 205 is transitioning back to the sleep mode (e.g., an indicator light of the smart washer W dims). The voice agent 205 of the smart dryer D determines the inquiry is intended for the smart dryer D, displays visual feedback to the user 30 that indicates the voice agent 205 is in the thinking mode, and generates and outputs a speech response to the user 30 that indicates an amount of time left on the smart dryer D.

Figure 5:
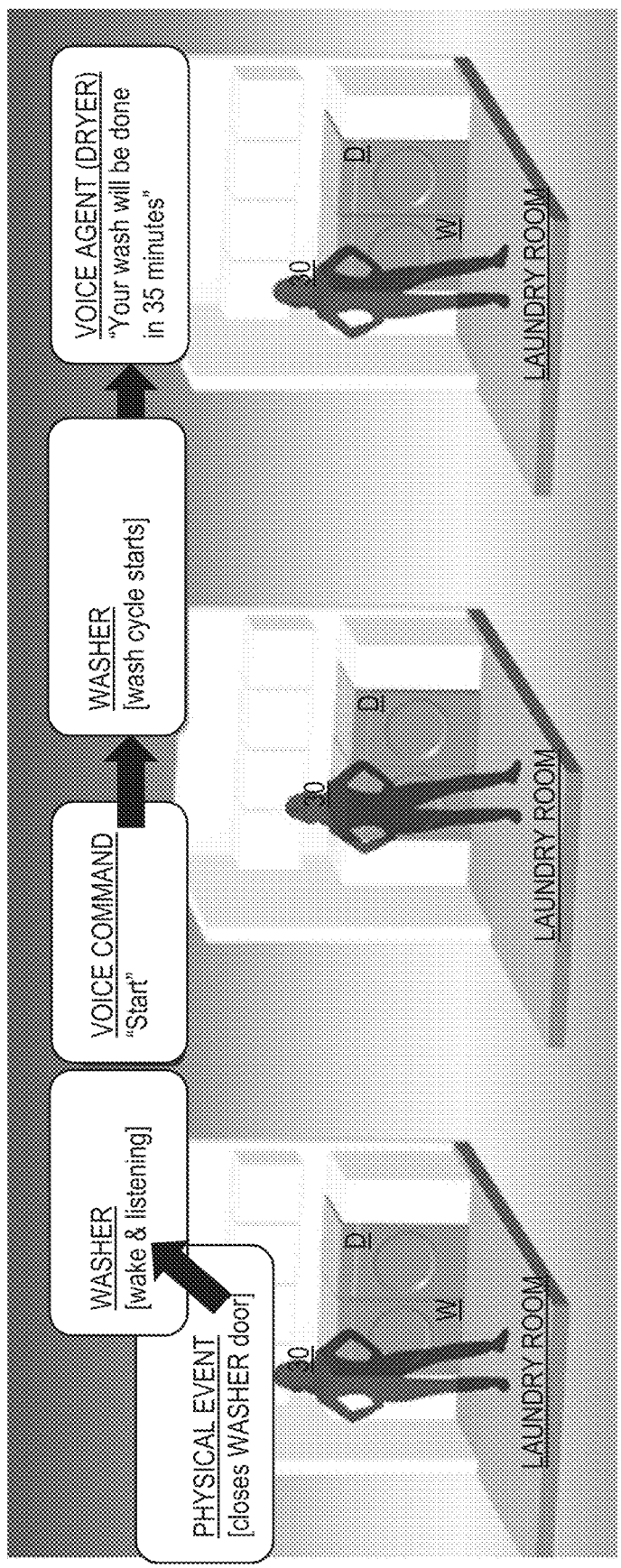
FIG. 5 illustrates a second example scenario involving multi-modal interaction with an intelligent assistant embodied in multiple electronic devices, in one or more embodiments.

FIG. 5 illustrates a second example scenario involving multi-modal interaction with an intelligent assistant embodied in multiple electronic devices 50, in one or more embodiments. In one embodiment, a user 30 can activate a voice agent 205 operating in an electronic devices 50 via different types of activation methods including physical event activation, providing multi-modal interaction. As shown in FIG. 5, a user 30 located in a laundry room can automatically activate a voice agent 205 of a particular electronic device 50 in the laundry room, such as a smart washer W, via physical event activation. For example, the user 30 automatically activates a voice agent 205 of the smart washer W via closing a door of a washing chamber of the smart washer W. This physical interaction with the smart washer W saves the user 30 from having to explicitly utter a wake word to wake up the voice agent 205 of the smart washer W. Further, as this physical interaction only involves the smart washer W, only the voice agent 205 of the smart washer W is woken up; it does not activate a voice agent 205 of a different electronic device 50 in the laundry room, such as a smart dryer D.

As shown in FIG. 5, the user 30 starts the smart washer W via a voice command that comprises a request to start. The voice command is simple, removing a need for the user 30 to explicitly utter a wake word to start the smart washer W. The voice agent 205 of the smart washer W determines the request is intended for the smart washer W, and triggers/invokes the smart washer W to start a wash cycle.

In one embodiment, a voice agent 205 operating in an electronic device 50 is configured to determine at least one other electronic device 50 that the electronic device 50 can be used in combination with. For example, based on recent actions performed by the smart washer W and the smart dryer D (e.g., users 30 wash clothes via the smart washer W first then dry the washed clothes via the smart dryer D), the voice agent 205 of the smart washer W determines the smart washer W and the smart dryer D can be used in combination. In one embodiment, the voice agent 205 of the smart washer W triggers the voice agent 205 of the smart dryer D to wake up from the sleep mode before the current wash cycle of the smart washer W ends. In one embodiment, the voice agent 205 of the smart washer W or the voice agent 205 of the smart dryer D provides feedback (e.g., speech and/or visual feedback) to the user 30 that indicates when the current wash cycle of the smart washer W will terminate. This feedback informs the user 30 when washed clothes can be removed from the smart washer W.

In one embodiment, the user 30 automatically activates the voice agent 205 of the smart dryer D via closing a door of a drying chamber of the smart dryer D after the user 30 has removed washed clothes from the smart washer W and placed the washed clothes in the drying chamber.

Figure 6:
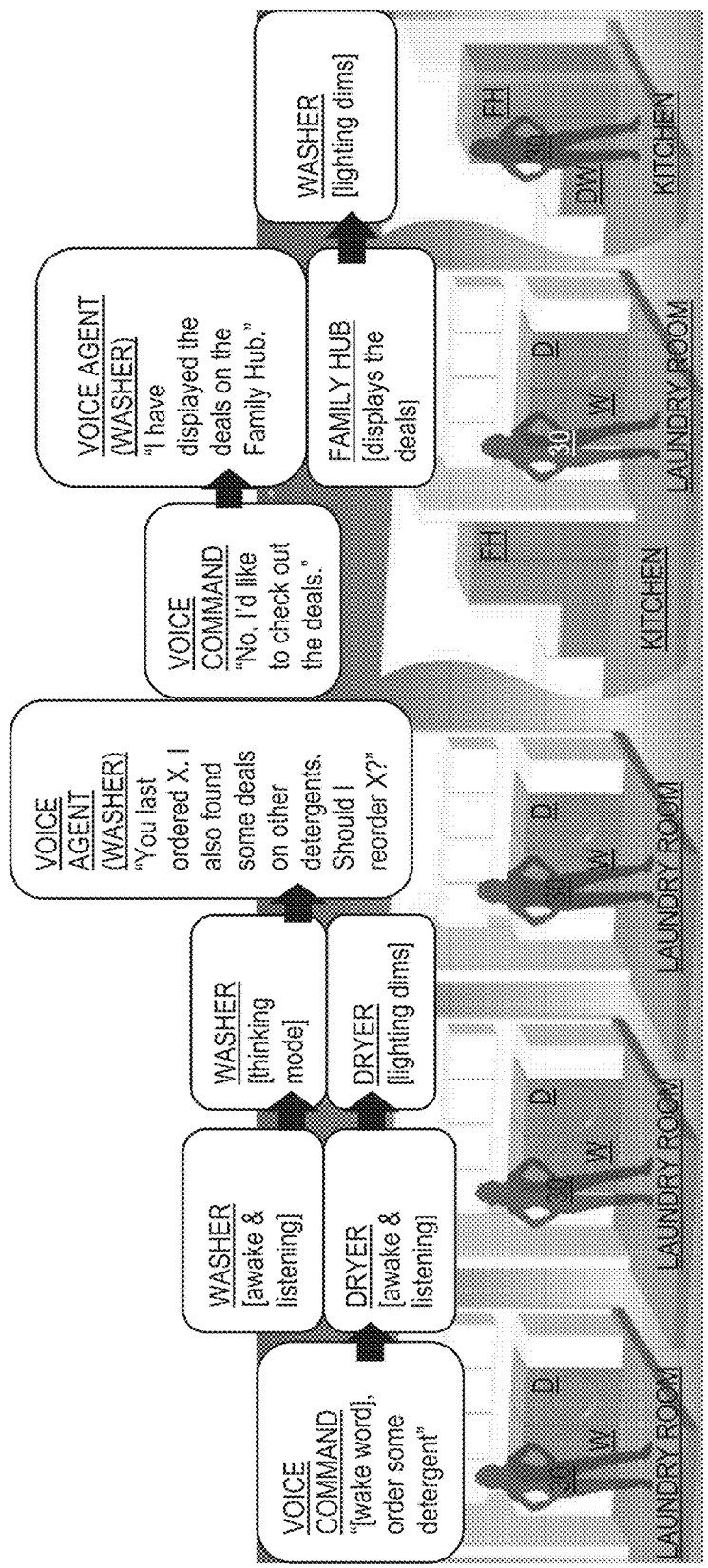
FIG. 6 illustrates a third example scenario involving multi-modal interaction with an intelligent assistant embodied in multiple electronic devices, in one or more embodiments.

FIG. 6 illustrates a third example scenario involving multi-modal interaction with an intelligent assistant embodied in multiple electronic devices 50, in one or more embodiments. In one embodiment, a voice agent 205 operating in multiple electronic devices 50 is configured to determine which of the multiple electronic devices 50 is best suited to responding to a voice command. As shown in FIG. 6, a user 30 located in a laundry room can activate each voice agent 205 of each electronic device 50 in the laundry room, such as a smart washer W and/or a smart dryer D, via wake word activation. For example, the user 30 activates both a voice agent 205 of the smart washer W and a voice agent 205 of the smart dryer D via a first voice command that begins with a wake word and is followed by a first request to order detergent.

As shown in FIG. 6, the voice agent 205 of the smart washer W and the voice agent 205 of the smart dryer D both wake up in response to the wake word. In one embodiment, the voice agent 205 of the smart dryer D determines the first request is not intended for the smart dryer D, rejects the first request, and displays visual feedback to the user 30 that the voice agent 205 is transitioning back to the sleep mode (e.g., an indicator light of the smart dryer D dims). The voice agent 205 of the smart washer W determines the first request is intended for the smart washer W, and displays visual feedback to the user 30 that the voice agent 205 is in the thinking mode.

As shown in FIG. 6, the voice agent 205 of the smart washer W generates and output a speech response to the user 30 that identifies a purchase of detergent the user 30 previously made and availability of deals on detergent. The user 30 responds to the voice agent 205 via a second voice command that comprises a second request to check out the deals. In one embodiment, the voice agent 205 of the smart washer W is configured to determine whether there is another electronic device 50 within proximity of the user 30 that is best suited to responding to the second request. For example, the voice agent 205 of the smart washer W determines a smart refrigerator FH in a kitchen is best suited to responding to the second request, triggers/invokes the smart refrigerator FH to display the deals on a touch screen of the smart refrigerator FH, and generates and outputs a speech response in the laundry room to the user 30 that indicates that the deals are displayed on the smart refrigerator FH. The voice agent 205 of the smart washer W makes use of a more capable nearby electronic device 50 to respond to the second request, and enables a natural mode switch from voice interaction (via the voice commands) to touch interaction (via the touch screen).

As shown in FIG. 6, when the user 30 moves to the kitchen to view the deals displayed on the smart refrigerator FH, the voice agent 205 of the smart washer W displays visual feedback that the voice agent 205 is transitioning back to the sleep mode (e.g., an indicator light of the smart washer W dims).

Figure 7:
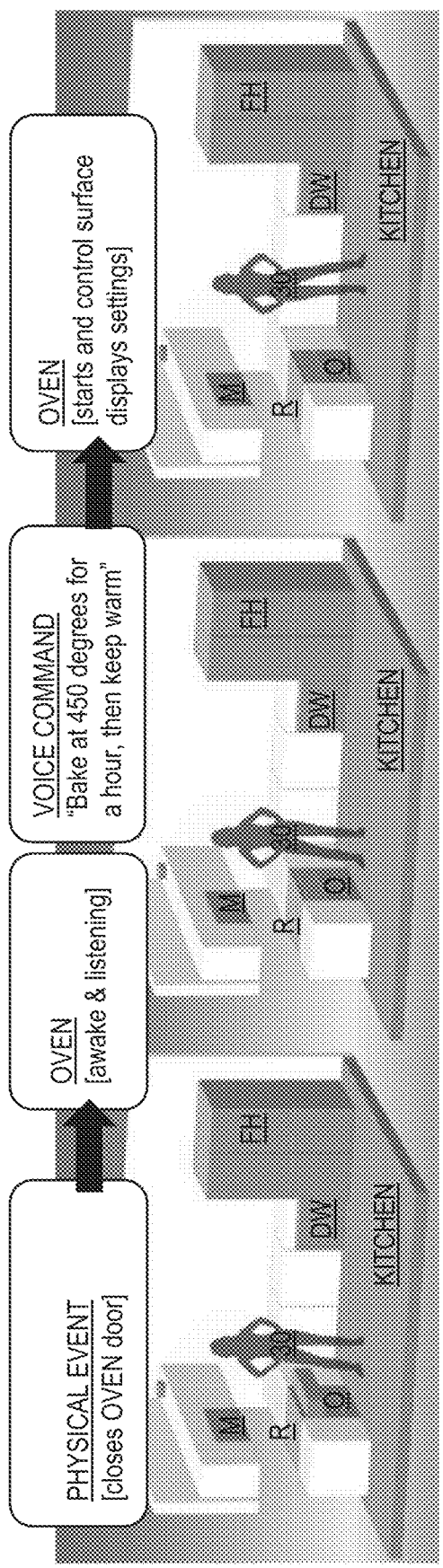
FIG. 7 illustrates a fourth example scenario involving multi-modal interaction with an intelligent assistant embodied in multiple electronic devices, in one or more embodiments.

FIG. 7 illustrates a fourth example scenario involving multi-modal interaction with an intelligent assistant embodied in multiple electronic devices 50, in one or more embodiments. In one embodiment, a user 30 can activate a voice agent 205 operating in an electronic devices 50 via different types of activation methods including physical event activation, providing multi-modal interaction. As shown in FIG. 7, a user 30 located in a kitchen can automatically activate a voice agent 205 of a particular electronic device 50 in the kitchen, such as a smart oven O, via physical event activation. For example, the user 30 automatically activates a voice agent 205 of the smart oven O via closing a door of an oven chamber of the smart oven O. This physical interaction with the smart oven O saves the user 30 from having to explicitly utter a wake word to wake up the voice agent 205 of the smart oven O. Further, as this physical interaction only involves the smart oven O, only the voice agent 205 of the smart oven O is woken up; it does not activate a voice agent 205 of a different electronic device 50 in the kitchen, such as a smart microwave M, a smart range R, a smart dishwasher DW, and/or a smart refrigerator FH.

As shown in FIG. 7, the user 30 starts the smart oven O via a voice command that comprises a request to bake at specified settings (e.g., 450 degrees for an hour, then keep warm). The voice command is simple, removing a need for the user 30 to explicitly utter a wake word to start the smart oven O. The voice agent 205 of the smart oven O determines the request is intended for the smart oven O, triggers/invokes the smart oven O to perform the request, and displays visual feedback to the user 30 via a control surface of the smart oven O, wherein the visual feedback is indicative of the settings. If the voice agent 205 of the smart oven O is still in the listening mode (i.e., a listening window for the voice agent 205 has not yet elapsed), the user 30 can issue another voice command that comprises a request to adjust the settings.

Other examples of physical event activations include, but are not limited to, the user 30 automatically activating a voice agent 205 of the smart microwave M via closing a door of the smart microwave M (e.g., after placing a food item into the smart microwave M for microwaving), the user 30 automatically activating a voice agent 205 of the smart refrigerator FH via closing a door of the smart refrigerator FH (e.g., after placing a food item into the smart refrigerator FH for refrigerating), the user 30 automatically activating a voice agent 205 of the smart DW via closing a door of a dishwashing chamber of the smart dishwasher DW (e.g., after placing plates in the dishwashing chamber for washing), etc.

In one embodiment, an activity performed by one electronic device 50 of a cluster of electronic devices 50 can activate a voice agent 205 of one or more other electronic devices 50 of the cluster. As shown in FIG. 7, the smart oven O, the smart microwave M, the smart range R, the smart dishwasher DW, and the smart refrigerator FH form a cluster of electronic devices 50 in the kitchen. Assume the user 30 is viewing a recipe for chicken parmesan that is displayed on a touch screen of the smart refrigerator FH. If the user 30 wants to cook the recipe, the user 30 can awaken a voice agent 205 operating in the cluster via wake word activation or physical event activation (e.g., UI activation such as selecting the recipe on the touch screen, door closure activation, etc.).

For example, assume the user 30 retrieves frozen chicken from the smart refrigerator FH and closes a door of the smart microwave M after placing the frozen chicken in the smart microwave M for defrosting. The voice agent 205 of the smart microwave M is activated in response to the door closure of the smart microwave M. When the user 30 issues a voice command "Start", the voice agent 205 determines contextual information relevant to the voice command, such as microwave settings necessary to perform the voice command. For example, based on the recipe and/or one or more online data sources, the voice agent 205 determines microwave settings such as temperature and amount of time necessary to defrost the frozen chicken, and triggers/invokes the smart microwave M to start in accordance with the microwave settings and display visual feedback via a control surface of the smart microwave M, wherein the visual feedback is indicative of the microwave settings. The user 30 can review the microwave settings displayed, and make adjustments, if necessary, via voice interaction (e.g., issuing a voice command) or touch interaction (e.g., interacting with the control surface).

If the recipe requires the chicken to be seared, a voice agent 205 of the smart range R can be activated before the smart microwave M finishes defrosting the chicken. For example, assume a voice agent 205 of the smart microwave M or a master device of the cluster triggers the voice agent 205 of the smart range R to wake up a minute or a couple of seconds before the smart microwave M finishes the defrosting. When the user 30 places a pan including the defrosted chicken on the smart range R (after retrieving the chicken from the smart microwave M) and issues a voice command "Start", the voice agent 205 of the smart range R determines contextual information relevant to the voice command, such as range settings necessary to perform the voice command. For example, based on the recipe and/or one or more online data sources, the voice agent 205 determines range settings such as temperature and amount of time necessary to sear the chicken, and triggers/invokes the smart range R to start in accordance with the range settings and display visual feedback via a control surface of the smart range R, wherein the visual feedback is indicative of the range settings. The user 30 can review the range settings displayed, and make adjustments, if necessary, via voice interaction (e.g., issuing a voice command) or touch interaction (e.g., interacting with the control surface).

If the recipe requires the chicken to be baked after it is seared, a voice agent 205 of the smart oven O can be activated before the smart range R finishes searing the chicken. For example, assume a voice agent 205 of the smart range R or a master device of the cluster triggers the voice agent 205 of the smart oven O to wake up a few minutes before the smart range R finishes the searing and to start pre-heating the smart oven O. The voice agent 205 determines contextual information relevant to pre-heating the smart oven O, such as oven settings necessary to pre-heat the smart oven O. For example, the voice agent 205 determines oven settings such as temperature and amount of time necessary to bake the chicken, and triggers/invokes the smart oven O to start a pre-heat in accordance with the temperature. When the user 30 places the pan including the seared chicken into the smart oven O and issues a voice command "Start", the voice agent 205 of the smart oven O triggers/invokes the smart oven O to start a bake in accordance with the oven settings and display visual feedback via a control surface of the smart oven O, wherein the visual feedback is indicative of the oven settings. The user 30 can review the oven settings displayed, and make adjustments, if necessary, via voice interaction (e.g., issuing a voice command) or touch interaction (e.g., interacting with the control surface).

Based contextual information relevant to the user 30 (e.g., sensor-based contextual information captured via at least one sensor unit 70, calendar information for the user 30, a voice command scheduled for the future, etc.), a voice agent 205 operating in the cluster (e.g., a master device) can determine, while the chicken is baking in the smart oven O, whether the user 30 will leave or has left the household (e.g., to pick-up children from school), and trigger/invoke the smart oven O to stop the bake while the user 30 is away. The voice agent 205 can trigger/invoke the smart oven O to resume the bake upon detecting that the user 30 has returned to the household.

Figure 8:
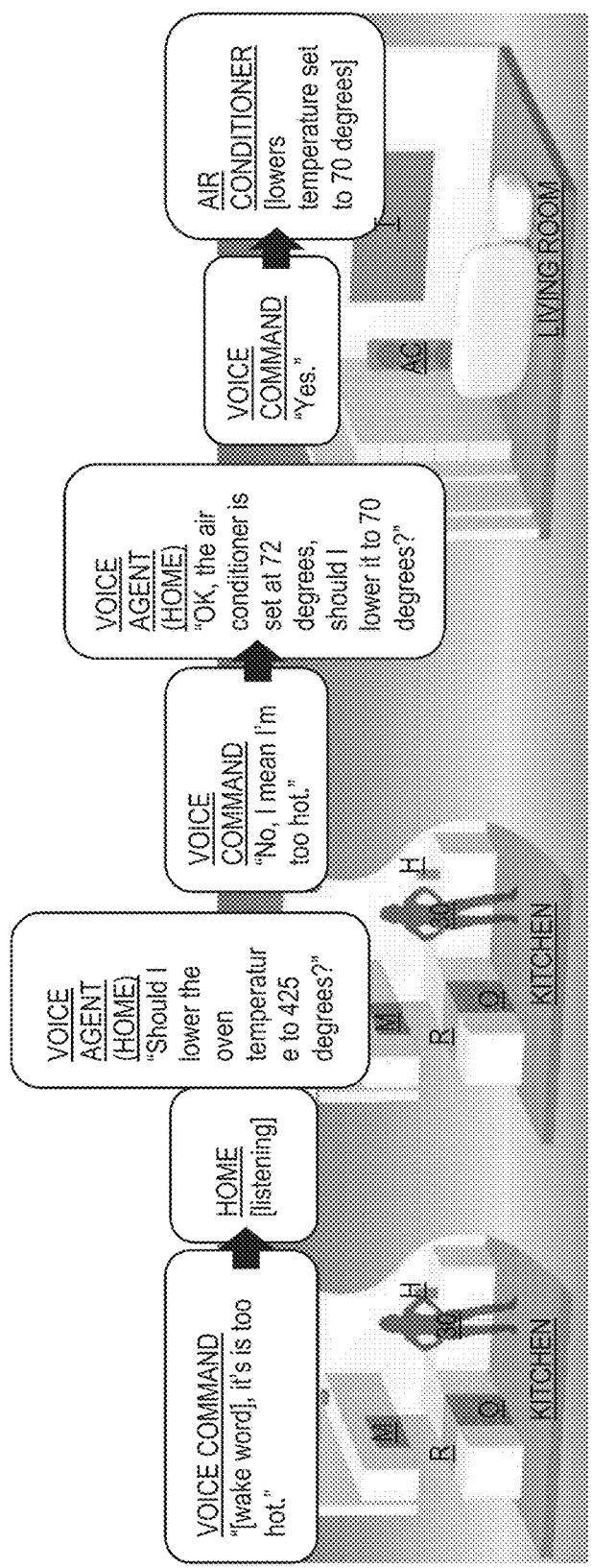
FIG. 8 illustrates a fifth example scenario involving multi-modal interaction with an intelligent assistant embodied in multiple electronic devices, in one or more embodiments.

FIG. 8 illustrates a fifth example scenario involving multi-modal interaction with an intelligent assistant embodied in multiple electronic devices 50, in one or more embodiments. In one embodiment, a voice agent 205 operating in multiple electronic devices 50 in multiple locations (e.g., different rooms) utilizes contextual information, confirmations, and clarifications to resolve multi-device disambiguation. As shown in FIG. 8, a user 30 located in a kitchen can activate a voice agent 205 operating in multiple electronic devices 50 in the kitchen, such as a smart microwave M, a smart range R, a smart oven O, and/or a smart home device H that includes a smart AI speaker, via wake word activation. For example, the user 30 activates the voice agent 205 via a first voice command that begins with a wake word and is followed by a statement that it is too hot.

In one embodiment, the smart home device H operates as a master device that controls multiple electronic devices 50 in different rooms. In one embodiment, when the voice agent 205 of the smart home device H wakes up in response to the wake word, the voice agent 205 is configured to determine contextual information relevant to the statement based on a current state of each of the multiple electronic devices 50 (e.g., which of the multiple electronic devices 50 is a contributing factor to the statement). For example, as shown in FIG. 8, if a current state of the smart oven O is that the smart oven O is baking, the voice agent 205 of the smart home device H determines that the current state of the smart oven O is relevant to the statement, and requests clarification from the user 30 by generating and outputting a speech response in the kitchen for the user 30 that inquires whether it should lower the temperature of the smart oven O.

As shown in FIG. 8, the user 30 responds to the voice agent 205 via a second voice command that clarifies the user 30 feels hot. In response to this clarification from the user 30, the voice agent 205 of the smart home device H determines contextual information relevant to the clarification based on a current state of each of the multiple electronic devices 50 other than the smart oven O (e.g., which of the multiple electronic devices 50 other than the smart oven O is a contributing factor to the clarification). For example, as shown in FIG. 8, if a current state of a smart air conditioner AC in a living room is that a temperature of the smart air conditioner AC is set too high, the voice agent 205 of the smart home device H determines that the current state of the smart air conditioner AC is relevant to the clarification, and requests clarification from the user 30 by generating and outputting a speech response in the kitchen for the user 30 that inquires whether it should lower the temperature of the smart air conditioner AC.

As shown in FIG. 8, the user 30 responds to the voice agent 205 via a third voice command that confirms the user 30 wants the voice agent 205 to lower the temperature of the smart air conditioner AC. In response to this confirmation from the user 30, the voice agent 205 of the smart home device H triggers/invokes the smart air conditioner AC to lower the temperature the smart air conditioner AC is set at.

Figure 9:
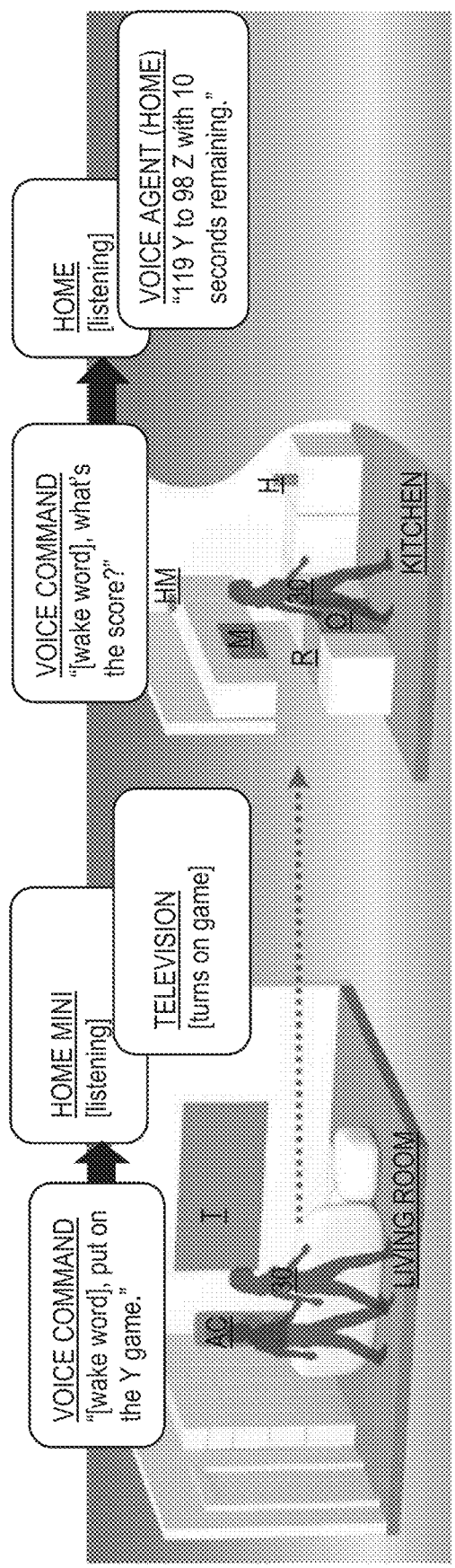
FIG. 9 illustrates a sixth example scenario involving multi-modal interaction with an intelligent assistant embodied in multiple electronic devices, in one or more embodiments.

FIG. 9 illustrates a sixth example scenario involving multi-modal interaction with an intelligent assistant embodied in multiple electronic devices 50, in one or more embodiments. In one embodiment, a user 30 can activate a voice agent 205 operating in multiple electronic devices 50 in multiple locations (e.g., different rooms), providing conversational NLU that is continuous and cross-device. As shown in FIG. 9, a user 30 located in a living room can activate a voice agent 205 operating in multiple electronic devices 50 in or within proximity of the living room, such as a smart air conditioner AC, a smart television T, and/or a smart home mini device HM that includes a smart AI speaker, via wake word activation. For example, the user 30 activates the voice agent 205 via a first voice command that begins with a wake word and is followed by a request for a Y game (e.g., a basketball game involving team Y) be put on.

In one embodiment, the smart home mini device HM operates as a master device that controls multiple electronic devices 50 in different rooms. In one embodiment, when the voice agent 205 of the smart home mini device HM wakes up in response to the wake word, the voice agent 205 is configured to determine which of the multiple electronic devices 50 the request is intended for (e.g., which of the electronic devices 50 is best suited to perform the request), and trigger/invoke the electronic device 50 that the request is intended for to perform the request. For example, as shown in FIG. 9, the voice agent 205 of the smart home mini device HM determines the request is intended for the smart television T, and triggers/invokes the smart television T to turn on the Y game.

In one embodiment, when the user 30 moves from the living room to a kitchen, the user 30 can activate a voice agent 205 operating in multiple electronic devices 50 in the kitchen, such as a smart microwave M, a smart range R, a smart oven O, and/or a smart home device H, via wake word activation. For example, as shown in FIG. 9, the user 30 activates the voice agent 205 via a second voice command that begins with a wake word and is followed by an inquiry for a score.

In one embodiment, the smart home device H operates as a master device that controls multiple electronic devices 50 in different rooms. In one embodiment, when the voice agent 205 of the smart home device H wakes up in response to the wake word, the voice agent 205 is configured to determine contextual information relevant to the inquiry based on a current state of each of the multiple electronic devices 50. For example, as shown in FIG. 9, the voice agent 205 of the smart home device H determines that the Y game on the smart television T is contextual information relevant to the inquiry, invokes an application (e.g., a software mobile application 90) to query for a current score of the Y game, and generates and outputs a speech response in the kitchen for the user 30 that provides the current score of the Y game.

Figure 10:
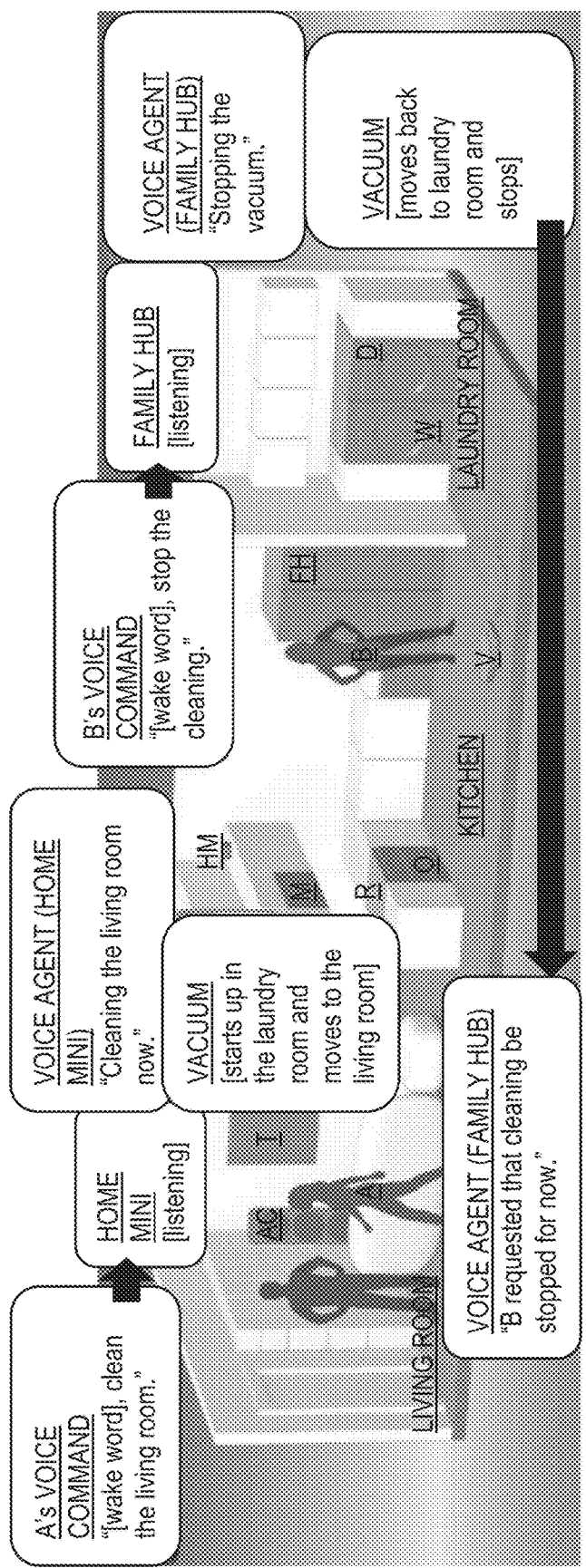
FIG. 10 illustrates a seventh example scenario involving multi-modal interaction with an intelligent assistant embodied in multiple electronic devices, in one or more embodiments.

FIG. 10 illustrates a seventh example scenario involving multi-modal interaction with an intelligent assistant embodied in multiple electronic devices 50, in one or more embodiments. In one embodiment, multiple users 30 can activate a voice agent 205 operating in multiple electronic devices 50 in multiple locations (e.g., different rooms), providing conversational NLU that is continuous, cross-device, and user aware. As shown in FIG. 10, a first user A located in a living room can activate a voice agent 205 operating in multiple electronic devices 50 in or within proximity of the living room, such as a smart air conditioner AC, a smart television T, and/or a smart home mini device HM, via wake word activation. For example, the first user A activates the voice agent 205 via a first voice command that begins with a wake word and is followed by a first request to clean the living room.

In one embodiment, the smart home mini device HM operates as a master device that controls multiple electronic devices 50 in different rooms. In one embodiment, when the voice agent 205 of the smart home mini device HM wakes up in response to the wake word, the voice agent 205 is configured to determine which of the multiple electronic devices 50 the first request is intended for, and trigger/invoke the electronic device 50 that the first request is intended for to perform the first request. For example, as shown in FIG. 10, the voice agent 205 of the smart home mini device HM determines the first request is intended for a smart vacuum V located in a laundry room, triggers/invokes the smart vacuum V to perform the first request by starting and moving to the living room, and generates and outputs a speech response in the living room for the first user A that acknowledges/confirms the first request.

As shown in FIG. 10, a second user B located in a kitchen can activate a voice agent 205 operating in multiple electronic devices 50 in or within proximity of the kitchen, such as a smart microwave M, a smart range R, a smart oven O, a smart home mini device HM, and/or a smart refrigerator FH, via wake word activation. For example, the second user B activates the voice agent 205 via a second voice command that begins with a wake word and is followed by a second request to stop the cleaning.

In one embodiment, the smart refrigerator FH operates as a master device that controls multiple electronic devices 50 in different rooms. In one embodiment, when the voice agent 205 of the smart refrigerator FH wakes up in response to the wake word, the voice agent 205 is configured to determine which of the multiple electronic devices 50 the second request is intended for based on a current state of each of the multiple electronic devices 50. For example, as shown in FIG. 10, the voice agent 205 of the smart refrigerator FH determines the second request is intended for the smart vacuum V, triggers/invokes the smart vacuum V to perform the second request by moving back to the laundry room and stopping, and generates and outputs a speech response in the kitchen for the second user B that acknowledges/confirms the second request.

In one embodiment, if a voice agent 205 operating in multiple electronic devices 50 in multiple locations (e.g., different rooms) receives conflicting voice commands from multiple users 30, the voice agent 205 is configured to inform at least one of the multiple users 30 of the conflict. For example, as shown in FIG. 10, the voice agent 205 of the smart refrigerator FH determines the first request and the second request are conflicting voice commands, recalls the first user A was located in the living room when the first user A issued the first request, and generates and outputs a speech response in the living room for the first user A that informs of the second user B issuing the second request.

Figure 11:
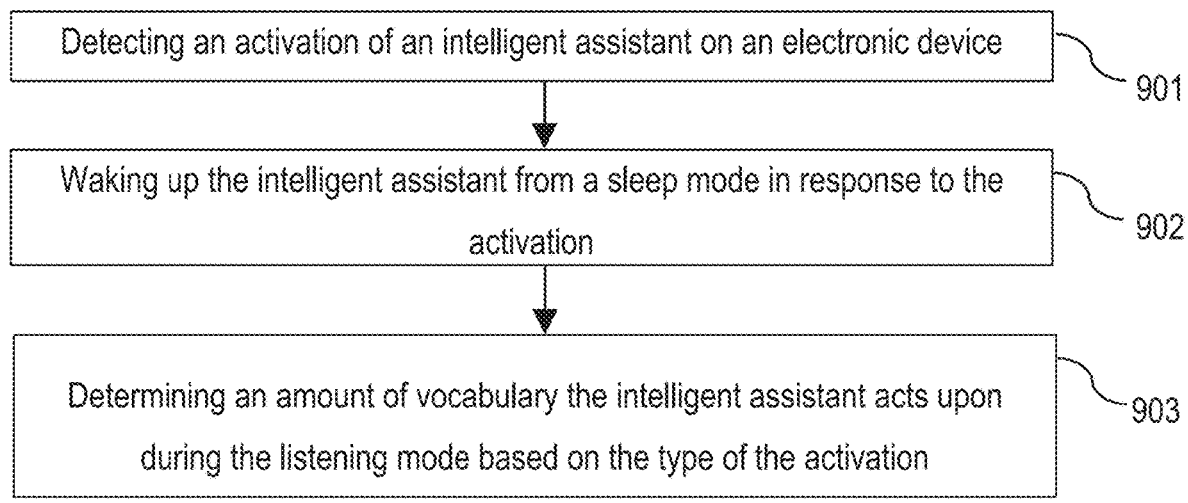
FIG. 11 is a flowchart of an example process for implementing multi-modal interaction with an intelligent assistant in an electronic device, in one or more embodiments.

FIG. 11 is a flowchart of an example process 900 for implementing multi-modal interaction with an intelligent assistant in an electronic device, in one or more embodiments. Process block 901 includes detecting an activation of an intelligent assistant (e.g., voice agent 205) on an electronic device (e.g., electronic device 50). Process block 902 includes waking up the intelligent assistant from a sleep mode in response to the activation. Process block 903 includes determining an amount of vocabulary the intelligent assistant acts upon during a listening mode based on a type of the activation.

In one embodiment, process blocks 901-903 may be performed by one or more components of the voice user interface system 200.

Figure 12:
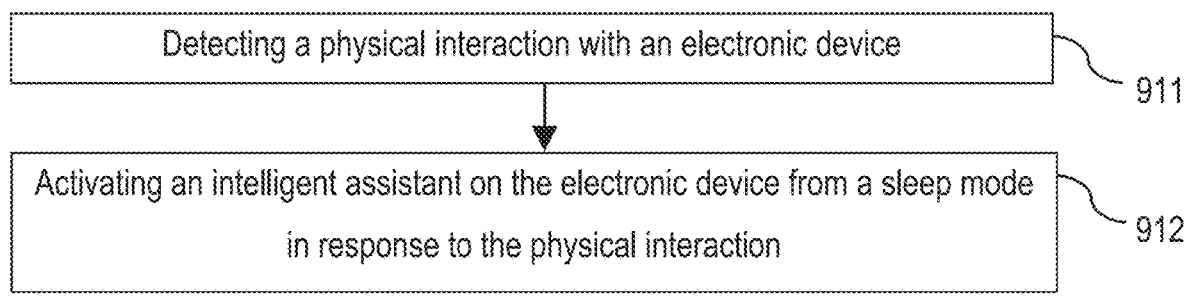
FIG. 12 is a flowchart of an example process 910 for implementing physical event activation of an intelligent assistant in an electronic device, in one or more embodiments.

FIG. 12 is a flowchart of an example process 910 for implementing physical event activation of an intelligent assistant in an electronic device, in one or more embodiments. Process block 911 includes detecting a physical interaction with an electronic device (e.g., electronic device 50). Process block 912 includes activating an intelligent assistant (e.g., voice agent 205) on the electronic device from a sleep mode in response to the physical interaction.

In one embodiment, process blocks 911-912 may be performed by one or more components of the voice user interface system 200.

Figure 13:
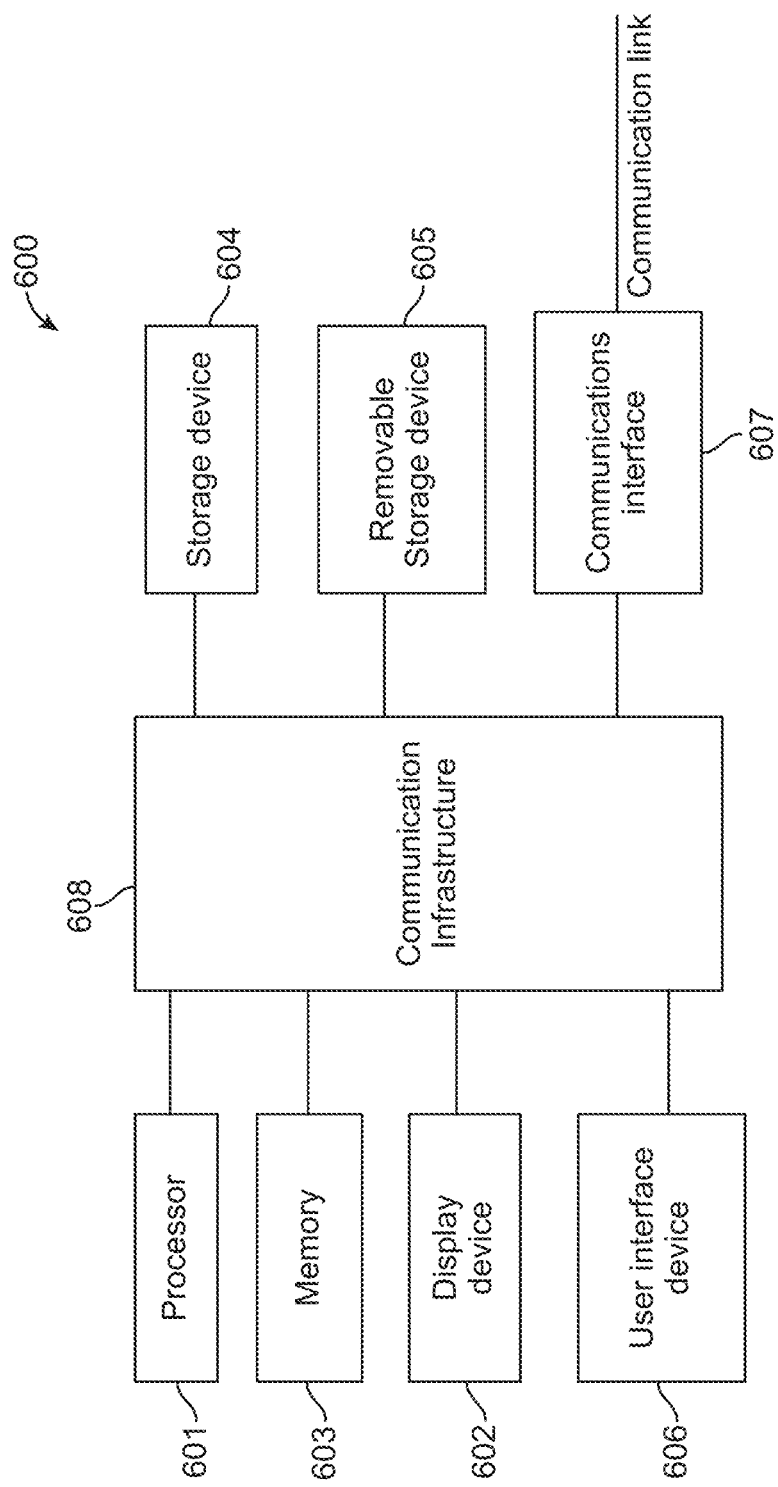
FIG. 13 is a high-level block diagram showing an information processing system comprising a computer system useful for implementing the disclosed embodiments.

FIG. 13 is a high-level block diagram showing an information processing system comprising a computer system 600 useful for implementing the disclosed embodiments. The system 200 may be incorporated in the computer system 600. The computer system 600 includes one or more processors 601, and can further include an electronic display device 602 (for displaying video, graphics, text, and other data), a main memory 603 (e.g., random access memory (RAM)), storage device 604 (e.g., hard disk drive), removable storage device 605 (e.g., removable storage drive, removable memory module, a magnetic tape drive, optical disk drive, computer readable medium having stored therein computer software and/or data), viewer interface device 606 (e.g., keyboard, touch screen, keypad, pointing device), and a communication interface 607 (e.g., modem, a network interface (such as an Ethernet card), a communications port, or a PCMCIA slot and card). The communication interface 607 allows software and data to be transferred between the computer system and external devices. The system 600 further includes a communications infrastructure 608 (e.g., a communications bus, cross-over bar, or network) to which the aforementioned devices/modules 601 through 607 are connected.

Information transferred via communications interface 607 may be in the form of signals such as electronic, electromagnetic, optical, or other signals capable of being received by communications interface 607, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to generate a computer implemented process. In one embodiment, processing instructions for process 900 (FIG. 11) and process 910 (FIG. 12) may be stored as program instructions on the memory 603, storage device 604, and/or the removable storage device 605 for execution by the processor 601.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. An electronic device, comprising:
   at least one display;
   at least one microphone;
   at least one speaker;
   at least one sensor; and
   at least one processor coupled to the at least one display, the at least one microphone, the at least one speaker, and the at least one sensor, and configured to:
   based on an occurrence of a first event that activates a speech recognition function of the electronic device, provide a first type feedback via the at least one speaker, the first event comprising identifying a wake word based on a first speech signal obtained via the at least one microphone;
   based on a voice command not being identified in a second speech signal obtained via the at least one microphone, after providing the first type feedback, provide a speech response via the at least one speaker;
   based on an occurrence of a second event that activates the speech recognition function of the electronic device, provide a second type feedback via the at least one display, the second event comprising detecting an external object based on a second signal obtained via the at least one sensor, and the second type feedback being different from the first type feedback, and
   based on a voice command not being identified in a third speech signal obtained via the at least one microphone, after providing the second type feedback, provide a visual response via the at least one display.

2. The electronic device according to claim 1, wherein the first type feedback comprises a feedback based on a sound and the second type feedback comprises a feedback based on a visual indication.

3. The electronic device according to claim 1, further comprising:
   at least one first sensor configured to obtain data indicative of a current state of the electronic device.

4. A home appliance device comprising the electronic device according to claim 1.

5. A method of operating an electronic device comprising at least one display, at least one microphone, at least one speaker, and at least one sensor, the method comprising:
   based on an occurrence of a first event that activates a speech recognition function of the electronic device, providing a first type feedback via the at least one speaker, the first event comprising identifying a wake word based on a first speech signal obtained via the at least one microphone;
   based on a voice command not being identified in a second speech signal obtained via the at least one microphone, after providing the first type feedback, providing a speech response via the at least one speaker;
   based on an occurrence of a second event that activates the speech recognition function of the electronic device, providing a second type feedback via the at least one display, the second event comprising detecting an external object based on a second signal obtained via the at least one sensor, and the second type feedback being different from the first type feedback; and
   based on a voice command not being identified in a third speech signal obtained via the at least one microphone, after providing the second type feedback, providing a visual response via the at least one display.

6. The method according to claim 5, wherein the first type feedback comprises a feedback based on a sound and the second type feedback comprises a feedback based on a visual indication.

7. The method according to claim 5, wherein the electronic device comprises at least one first sensor, and the method comprises obtaining, from the at least one first sensor, data indicative of a current state of the electronic device.

8. The method according to claim 5, wherein the electronic device is part of a home appliance device.

9. The electronic device according to claim 1, wherein the speech response is provided when the voice command is not identified in the second speech signal within a first time period after providing the first type feedback.

10. The electronic device according to claim 9, wherein the visual response is provided when the voice command is not identified in the third speech signal within a second time period after providing the second type feedback.

11. The electronic device according to claim 10, wherein the first time period is different from the second time period.

12. The electronic device of claim 10, wherein the at least one processor is further configured to determine the second time period to be less than the first time period.

13. The electronic device according to claim 10, wherein the at least one processor is further configured to determine the first time period corresponding to a listening mode entered in response to the first event and determine the second time period corresponding to a listening mode entered in response to the second event.

14. The method according to claim 5, wherein the speech response is provided when the voice command is not identified in the second speech signal within a first time period after providing the first type feedback.

15. The method according to claim 14, wherein the visual response is provided when the voice command is not identified in the third speech signal within a second time period after providing the second type feedback.

16. The method according to claim 15, wherein the first time period is different from the second time period.

17. The method according to claim 15, wherein the second time period is determined to be less than the first time period.

18. The method according to claim 15, wherein the first time period is determined corresponding to a listening mode entered in response to the first event and the second time period is determined corresponding to a listening mode entered in response to the second event.

* * * * *